United States Patent [19]

Specktor et al.

[11] Patent Number: 4,838,573

[45] Date of Patent: * Jun. 13, 1989

[54] DEVICE FOR ADJUSTING TOE OF A VEHICLE WHEEL

[75] Inventors: John Specktor, Golden Valley; Gerald A. Specktor, St. Paul, both of Minn.

[73] Assignee: Shim-A-Line, Inc., Minneapolis, Minn.

[ * ] Notice: The portion of the term of this patent subsequent to Jan. 12, 2005 has been disclaimed.

[21] Appl. No.: 104,351

[22] Filed: Oct. 2, 1987

Related U.S. Application Data

[63] Continuation-in-part of Ser. No. 896,637, Aug. 15, 1986, Pat. No. 4,718,691.

[51] Int. Cl.⁴ .................................................. B62D 17/00
[52] U.S. Cl. ........................................ 280/661; 280/673
[58] Field of Search ...................... 280/661, 96.1, 673

[56] References Cited

U.S. PATENT DOCUMENTS

| | | | |
|---|---|---|---|
| 3,357,661 | 12/1967 | Aakjar | 280/661 |
| 3,880,444 | 4/1975 | Bridges | 280/661 |
| 4,057,120 | 11/1977 | Roethlisberger | 280/661 |
| 4,400,008 | 8/1983 | Rumpel | 280/666 |
| 4,420,272 | 12/1983 | Ingalls et al. | 280/661 |
| 4,424,984 | 1/1984 | Shiratori et al. | 280/661 |
| 4,453,733 | 6/1984 | Sautter et al. | 280/661 |
| 4,456,282 | 6/1984 | Rumpel | 280/690 |
| 4,457,536 | 7/1984 | Rumpel | 280/663 |
| 4,457,537 | 7/1984 | von der Ohe et al. | 280/675 |
| 4,458,913 | 7/1984 | Rumpel | 280/663 |
| 4,458,918 | 7/1984 | Rumpel | 280/719 |
| 4,462,609 | 7/1984 | von der Ohe | 280/690 |
| 4,478,430 | 10/1984 | Maebayashi et al. | 280/690 |
| 4,480,852 | 11/1984 | Rumpel | 280/663 |
| 4,493,493 | 1/1983 | Satchell | 280/661 |
| 4,511,160 | 4/1985 | Inoue | 280/701 |
| 4,515,391 | 5/1985 | Koide | 200/690 |
| 4,529,222 | 7/1985 | Kijima et al. | 280/701 |
| 4,530,514 | 7/1985 | Ito | 280/701 |
| 4,616,845 | 10/1986 | Pettibone | 280/661 |
| 4,718,691 | 1/1988 | Specktor et al. | 280/661 |

OTHER PUBLICATIONS

Machine Design, Nov. 18, 1971, pp. 60, 61, 84 & 85.

*Primary Examiner*—Kenneth R. Rice
*Attorney, Agent, or Firm*—Kinney & Lange

[57] ABSTRACT

A device is used to adjust alignment of a vehicle wheel connected to a vehicle by a suspension system having an arm member affecting wheel alignment. The arm member has a first bore transversely disposed therethrough with respect to the axis of the member with the arm member being attached to the vehicle by a bolt extending through the first bore. The device displaces the bolt of the control arm from its original position to a second preselected position, thereby adjusting the alignment of the wheel.

3 Claims, 4 Drawing Sheets

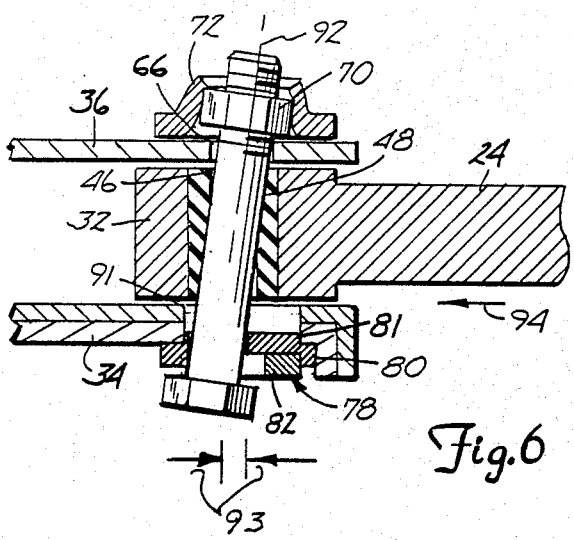
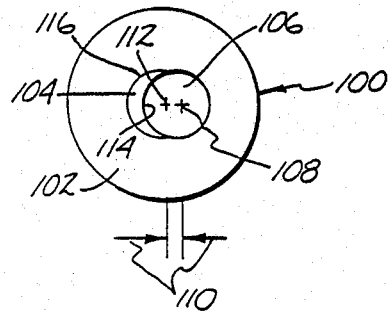
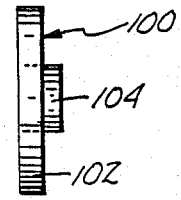
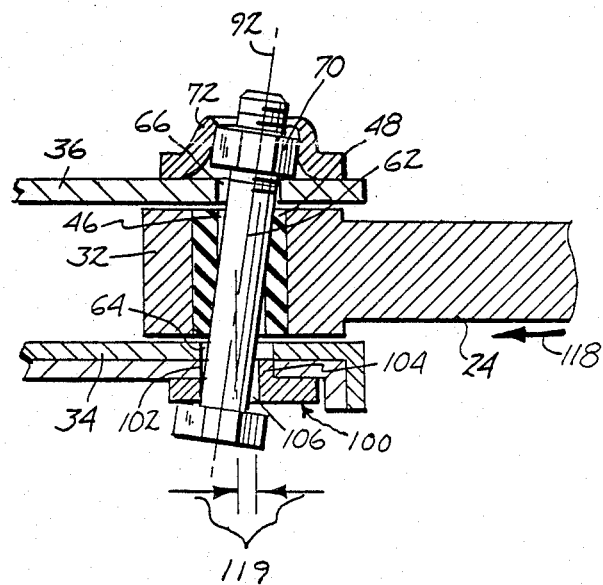
Fig.6
Fig.7
Fig.8
Fig.9

DEVICE FOR ADJUSTING TOE OF A VEHICLE WHEEL

REFERENCE TO CO-PENDING APPLICATION

This application is a continuation-in-part of an application entitled "Device for Adjusting Toe of a Vehicle," assigned Ser. No. 896,637 which was filed on Aug. 15, 1986, now U.S. Pat. No. 4,718,691.

BACKGROUND OF THE INVENTION

1. Field of the Invention.

The present invention relates to devices for adjusting alignment of a vehicle wheel and, in particular, it relates to a device that displaces an arm member that affects the alignment of the wheel.

2. Description of the Prior Art.

There has been a general trend in the manufacture of automobiles to make automobiles lighter. To further accomplish this end, conventional axles and suspensions are being eliminated and strut-type suspensions, such as the McPherson-type suspension, are being used more and more.

One type of strut suspension used by the Ford Motor Company in their Tempo and Topaz brand automobiles uses two spaced-apart front and rear control arms to hold the wheels in a selected toe angle. Toe angle, as used in the present application, is defined as the side-to-side slant of the tires along their forward portion and referenced from a line positioned along an axis common to the front and rear tires. The front and rear control arms are attached at their outer ends to the wheels and are pivotally attached at their inner ends to the underside of the vehicle. The inner ends are positioned between two plates that extend downwardly from the underside of the vehicle and a pin or bolt extends through the plates and through the inner end of the control arm. If the toe angle of the wheels has been altered due to an accident, or is in error due to factory assembly, readjustment of the wheels to the proper toe angle is not readily possible.

SUMMARY OF THE INVENTION

The present invention includes a device for adjusting alignment of a vehicle wheel whose alignment is affected by an arm member. The arm member has a first bore disposed transversely to the arm member's axis. The arm member is attached to a mounting mechanism by a bolt extending through a second bore in the mounting mechanism and the first bore of the arm member. The device of the present invention displaces the bolt thereby adjusting the alignment of the vehicle wheel.

BRIEF DESCRIPTION OF THE DRAWINGS

FIG. 6 is a sectional view of the device of FIGS. 3 and 4 illustrating the device with the bolt being angularly displaced and the control arm being moved.

FIG. 7 is an elevational view of an alternative embodiment of the device of the present invention.

FIG. 8 is a side view of the alternative embodiment of FIG. 7.

FIG. 9 is a sectional view showing the device of FIGS. 7 and 8 in use.

DETAILED DESCRIPTION OF THE PREFERRED EMBODIMENTS

Figure 1:
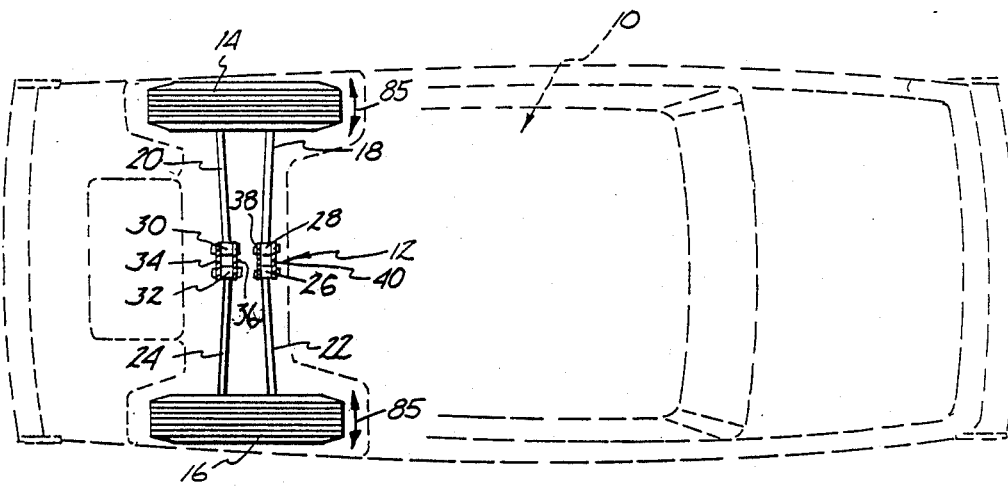
FIG. 1 is a plan view illustrating a vehicle having a pair of nondriven rear wheels whose toe angle is retained by a pair of control arms.

The present invention includes a device and method for adjusting toe angle of a vehicle wheel having a pair of transversely-disposed control arms for controlling the toe angle. Referring now to FIG. 1, a motor vehicle is generally indicated in broken lines at 10. The motor vehicle 10 is a front-wheel drive vehicle with the front wheels not being shown and the rear wheels indicated generally at 12. The rear wheels 12 are non-driven wheels and are independently suspended. Typically, such wheels are suspended by a strut-type suspension which is well known in the art. The wheels include individual left road wheel 14 and right road wheel 16.

The toe angle of the road wheel 14 is retained by a left front control arm 18 and a left rear control arm 20. Similarly, the toe angle of the wheel 16 is retained by a right front control arm 22 and right rear control arm 24. Each control arm is pivotally attached to a wheel spindle (not shown) of the respective road wheel at an outer end. Each of the control arms are attached to the vehicle 10 at inner ends 26, 28, 30 and 32. The inner ends 26 and 28 of the front control arms are positioned between a front mounting plate 40 and a rear mounting plate 38. Similarly, the inner ends 30 and 32 of the rear control arms 20 and 24 are positioned between a front mounting plate 36 and a rear mounting plate 34. The mounting plates 34 and 36, and the mounting plates 38 and 40 are disposed substantially parallel to each other and transversely to the longitudinal axis of the vehicle. The mounting plates are fixedly attached to the underside of the vehicle, such as to a unitized body chassis that is common in present-day vehicles.

Figure 2:
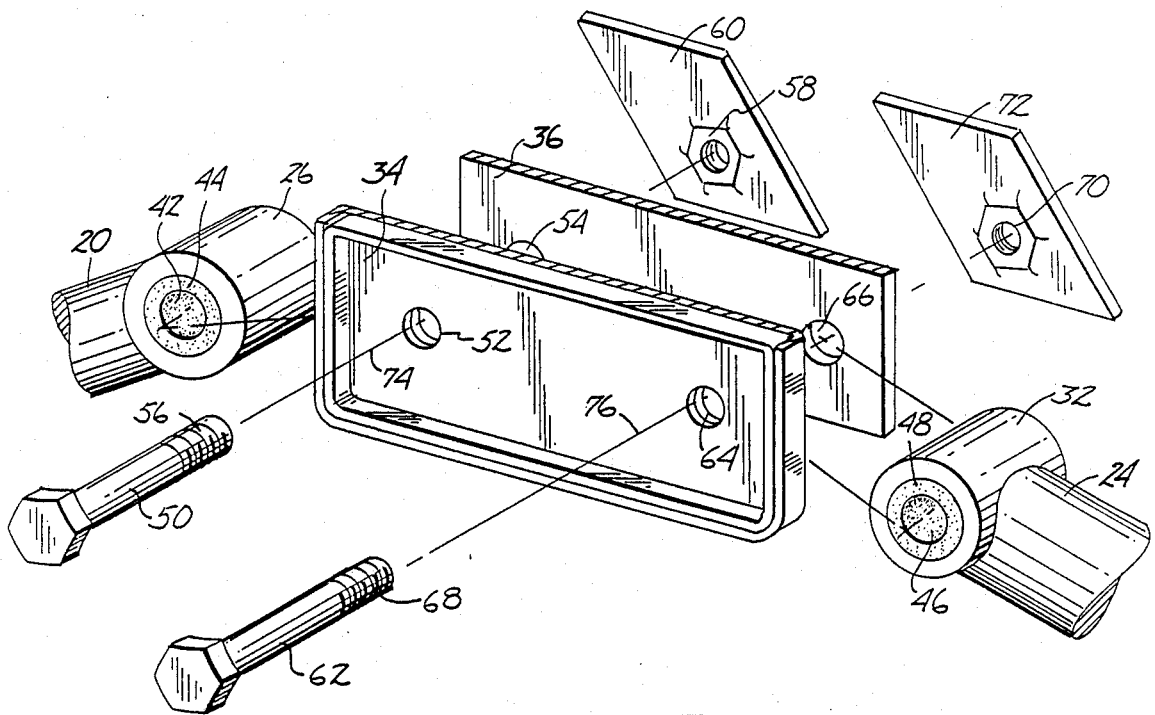
FIG. 2 is an exploded perspective view illustrating the manner in which the control arms are connected to the vehicle.

The pivotal connection of the control arms to the vehicle is best illustrated in FIG. 2 where the pivotal connection of the control arms 20 and 24 is illustrated in an exploded view. Since the pivotal connection of the front control arms is similar to the rear control arms, only the rear control arms will be described. The end portion 30 of the left rear control arm 20 includes a bore 42 lined with a resilient bushing 44. The end portion 32 also includes a bore 46 lined with a resilient bushing 48. The control arm 20 is pivotally attached to the mounting plates 34 and 36 by a bolt 50 extending through an aperture 52 in the mounting plate 34, then through the bore 42 and through an aperture 54 in the mounting plate 36. A threaded end portion 56 of the bolt is engaged by a nut 58 contained by a harness 60. Similarly, the control arm 24 is pivotally attached to the mounting plates 34 and 36 by a bolt 62 extending through an aperture 64 in the mounting plate 34, and then through the bore 46 of the end portion 32, and then through an aperture 66 in the mounting plate 36. A threaded end portion 68 of the bolt 62 is engaged by a nut 70 contained by a harness 72.

The control arm 20 pivots about an axis 74 defined by the position of the bolt 50 as installed in the factory. Similarly, the control arm 24 pivots about an axis 76 defined by the position of the bolt 62 as installed in the factory.

As stated previously, a problem exists in adjusting the toe angle if the vehicle becomes involved in an accident. In most cases, the control arms as installed by the manufacturer do not include a mechanism for adjusting toe angle.

Figure 3:
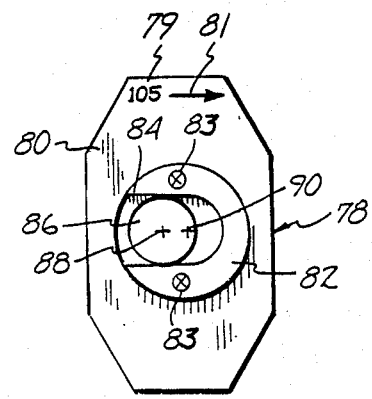
FIG. 3 is a front elevational view of a device of the present invention.
Figure 4:
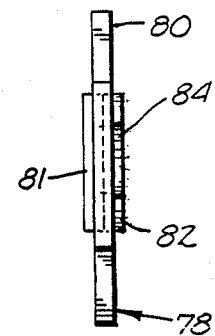
FIG. 4 is a side view of the device of FIG. 3.

A preferred embodiment of the device of the present invention is indicated at 78 in FIGS. 3–6. As illustrated in FIGS. 3 and 4, the device 78 includes a main plate member 80 preferably of an octogonal configuration, an aperture-engaging portion 81 and a bolt engaging member 82, as best illustrated in FIGS. 3 and 4. The portion 81 is preferably a circular disk portion being formed by stamping the plate member 80 such that the disk portion extends outwardly therefrom. The member 82 is attached by screws 83 or can be welded to the plate 80. The member 82 is preferably a circular plate with a center 90 and a slot 84 extending through the center of the member. The slot 84 ends in an arcuate wall 86. An aperture 86 having a diameter substantially equal to or greater than the bolts 50 and 62, and having a center 88 is drilled through the portion 81 such that the center 88 is offset from the center 90. The member 82 is positioned on the plate 80 such that the aperture 86 is aligned with the slot 84.

In another aspect of the present invention, the device 78 includes indicia located on the plate member 80, as illustrated in FIG. 3. The indicia include part number indicia 79 and direction indicia 81. The part number indicia 79 indicate the distance of the offset, in other words, the distance of the center 88 from the center 90. In the working embodiment described in the present application, a number of devices 78 are provided for use, with the centers 88 offset from the center 90 in increments of 1/64 inch. In the part number indicia 79, the last number, the number on the right, indicates the number of 1/64 inch increments that the center 88 is offset from the center 90. In the example in FIG. 3, the number 5 indicates that the center 88 is offset from the center 90 by 5/64 inch. The directional indicia 81, which is an arrow in the example given, indicates the direction in which toe of the wheel is adjusted, as indicated by arrows 85 in FIG. 1. It should be noted that the arrow 81 points in the opposite direction of the offset from the center 90, which is the direction that the forward portion of the wheel is moved. It should be further noted that if the device 78 is turned 180° to produce the offset in an opposite direction from the center 90, the indicia 79 and 89 will be at the lowermost position of the device, and the arrow 81 will correctly point to the direction in which the front of the wheel, as indicated by arrows 85 in FIG. 1, will move.

Figure 5:
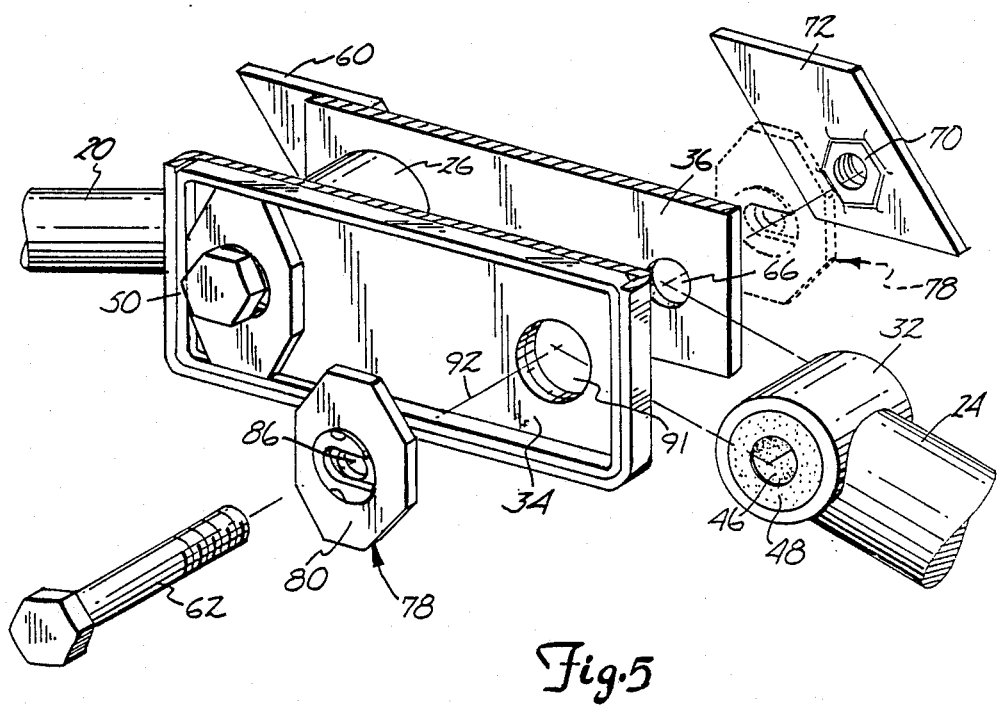
FIG. 5 is an exploded perspective view illustrating how the device of FIGS. 3 and 4 is used to adjust toe angle.

Referring to FIGS. 5 and 6, where the device 78 is illustrated in use, for example, to correct toe adjustment on wheel 16. One of the control arms 20 or 24 is disconnected from its mounting to the underside of the vehicle. In the example discussed, control arm 24 is disconnected, as illustrated in FIG. 5, by disconnecting the bolt 62 from the nut 70 and removing the bolt from the apertures 64, 66 and the bore 46 of the arm 24. The aperture 64 is then drilled out to form a larger aperture 91 substantially equal to the diameter of the portion 81. In the case of a Ford Tempo or Topaz, the original aperture is at least three-eighths inch (⅜") diameter to accommodate a ⅜" bolt. The aperture 64 in the present example is drilled out to three-quarters inch (¾") diameter to accommodate the member 81 which is also ¾" in diameter. The device 78 is then placed alongside the plate 34 with the member 81 inserted into the aperture, as best illustrated in FIG. 6. The bolt 62 is then inserted through the apertures 86 and 91, through the bore 48 of the control arm 24 and the aperture 66 to threadably engage the nut 70. The member 82 provides a surface for the head of the bolt 62 to rest. Since the center 88 of the aperture 86 is offset from the center 90 of the member 82, the bolt 62 is offset from the original axis 76 illustrated in FIG. 2 to a new axis 92. The bolt 62 is displaced along the new axis 92 angularly from the original axis 76 a preselected distance through the use of the device 78 as indicated by reference character 93. The flexible sleeve 48 permits the bolt 62 to be angularly disposed within the bore 46. Since the bolt 62 has been moved, the control arm 24 is also moved a preselected distance in a direction of arrow 94. By moving the one control arm 24 a preselected distance, the toe angle of the wheel 16 is adjusted a preselected value.

Preferably, a set of the devices 78 is provided to the user. The set includes a plurality of the devices with each device in the set having the center of the aperture 86 offset from the center of the member 82 an incrementally larger amount. For example, in the first device of the set, the aperture 86 is offset from the center 90 1/32 of an inch. The next device is offset 3/64 of an inch or 1/64 of an inch more than in the first device. Each device thereafter is offset an additional increment of 1/64 of an inch. Nine such devices have been found to be sufficient to provide an adequate range to adjust the toe angle in a Ford Tempo or Topaz back to the manufacturer's suggested toe angle.

The bolt 62 can also be offset parallel to the original axis 76. The aperture 66 of the plate 36 can also be redrilled as the aperture 64, and the device 78' (indicated in broken lines in FIG. 5) inserted therein. The bolt 62 is then displaced along a new axis that is substantially parallel to the old axis, thereby moving the control arm and adjusting the toe angle.

In addition, if both control arms 24 and 22 were adjusted using the device 78 of the present invention with one device having a greater offset than the other device, camber of the wheel may also be adjusted.

An alternative embodiment of the present invention is generally indicated at 100 in FIGS. 7–9. The device 100 includes a primary plate 102 and an aperture-engaging member 104. The plate 102 is preferably of a generally circular configuration, although any configuration is suitable. The plate 102 includes an aperture 106 having a center 108. The aperture-engaging member 104 also includes a center 112. The center 108 is offset from the center 112. The aperture 106 has a diameter sufficient to permit passage of the bolt 62. The member 104 is of a crescent-shaped configuration having an inner surface 114 adjacent the aperture 106 and an outer surface 116 for engaging the wall of the aperture 64. The surface 116 has approximately the same arc as the wall of the aperture 64.

In FIG. 9, the device 100 is shown in use. The bolt 62 is disengaged from the nut 70 and removed from the apertures 64, 66 and the bore 48 of the control arm 24. The member 104 of the device 100 is then inserted into the aperture 64 of the plate 34. The member 104 is positioned against the wall of the aperture 64 such that the aperture 106 of the device 100 is partially blocked by a portion of the plate 34. Using the aperture 106 as a guide, the portion of the plate 34 blocking the aperture 106 is then drilled out using a ⅜" drill (which is approximately the diameter of the bolt 62). After drilling out the portion of the plate 34 blocking the aperture 106, the bolt 62 is then inserted through the aperture 106, the newly drilled-out portion of the plate 36 and aperture 64 through the bore 46 of the arm 24 and through the aperture 66 of the plate 36 for threadable engagement with the nut 70. Since the center of the aperture 106 is offset from the center 112 (which lies along the original axes 76 illustrated in FIG. 2), the bolt is displaced angularly to a new axis 92. The flexible sleeve 48 permits the bolt 62 to be angularly disposed. Since the bolt 62 has been moved, the control arm 24 is also moved a preselected distance in a direction of arrow 118 and as indicated by reference character 119. By moving the one control arm 24 a preselected distance, the toe angle of the wheel 16 is adjusted a preselected value.

Similar to the device 78, a set of the devices 100 is provided to the user for adjusting toe angle. The set includes a plurality of the devices with each device in the set having the center of the aperture 116 offset from the center 112 of the member 104 an incrementally larger amount. For example, in the first device of the set, the center 108 of the aperture 106 is offset from the center 112 by 1/32 of an inch. The center 108 of the aperture 106 in the next device is offset 3/64 of an inch, or 1/64 of an inch more than in the first device, from the center 112. The center 108 of the aperture 106 in each device thereafter is offset an additional increment of 1/64 of an inch. Again, similar to the device 78, nine of the devices 100 have been found to be sufficient to provide an adequate range to adjust the toe angle in a Ford Tempo or Topaz back to the manufacturer's suggested toe angle.

The device 100, similar to the device 78, can be used to displace the bolt to a new axis substantially parallel to the old axis by attaching the device to both plates 34 and 36. In addition, placing the device 100 in plates 34, 36, 38 and 40, moving both control arms can also adjust the camber of the wheel.

Figure 10:
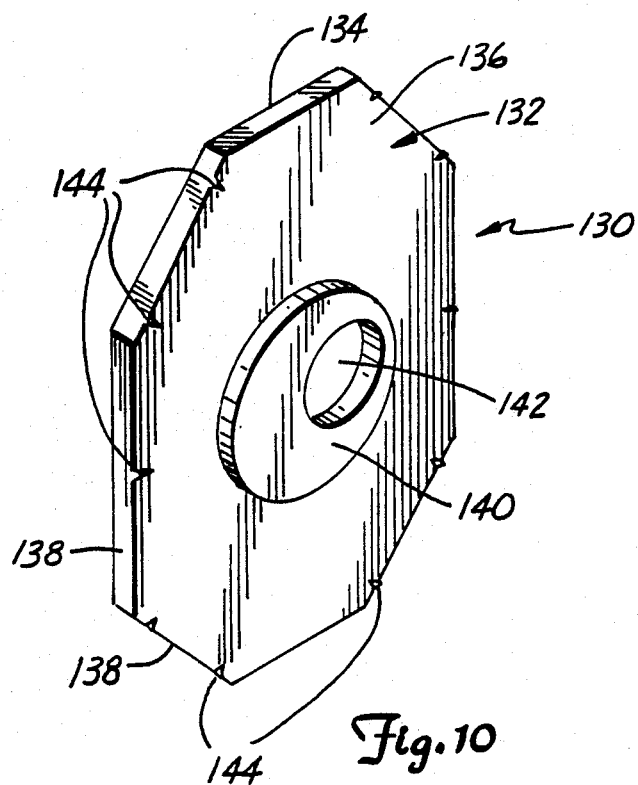
FIG. 10 is a perspective view of an alternative embodiment of the device of the present invention.

Referring to FIG. 10, an alternative embodiment of the present invention is generally indicated at 130. The device 130 includes a main plate member 132 having a front surface 134 and a back surface 136 and a plurality of side surfaces 138. Any number of side surfaces are includable within the present invention. The device 130 further includes an aperture-engaging portion 140, preferably in the form of a disk that is formed by stamping the main plate 132. A bore 142 is disposed within the disk 140. The center of the bore 142 is disposed a selected distance from the center of the disk 140.

The device 130 also includes a plurality of prongs 144 extending outwardly from the surface 136. The prongs 144 are positioned to engage the mounting plate 34, as illustrated in FIG. 5, or any other type of mounting mechanism to which the control arm 24 is attached.

The device 130 is used in the same manner as the device 78, as was described with reference to FIGS. 5 and 6. The prongs 144 engage the mounting plate 34, or any other mounting surface that the device is used against, and retain the device 130 in a fixed angular relationship with respect to the axis extending through the center of the bore 142.

In summary, the device of the present invention provides a simple manner to adjust the toe angle of a wheel wherein the toe angle is retained by a pair of transversely-disposed control arms. A minimum amount of alteration to the mounting plates is required to use the device of the present invention for adjusting the toe angle.

The device of the present invention further provides a permanent and stronger connection between the control arms and the mounting plate than the original equipment design.

Although the present invention has been described with reference to preferred embodiments, workers skilled in the art will recognize that changes may be made in form and detail without departing from the spirit and scope of the invention.

What is claimed is:

1. A device for adjusting a wheel attached to a vehicle by a suspension system that includes at least one arm member affecting wheel alignment, said member having an end with a first bore transversely disposed therethrough with respect to the axis of the member, said first bore being coaxially disposed along a first axis of a second bore disposed in mounting means attached to the vehicle and a bolt means extending through the first and second bores along the first axis, the device comprising:
   a base having a third bore with a first center;
   engaging means extending outwardly from the base for engaging the second bore, the engaging means having an outer arcuate surface that secures against an inner curvature of the first bore thereby centering the third bore a preselected distance from the first axis; wherein the bolt means extends through the first, second and third bores such that the bolt means lies along a second axis disposed from the first axis; and
   a plurality of prongs extending from a side of the base member facing the mounting means.

2. A method for adjusting alignment of a wheel attached to a vehicle by a suspension system that includes at least one arm member affecting wheel alignment said member having an end with a first bore transversely disposed therethrough with respect to the axis of the member, said first bore being coaxially disposed along a first axis of a second bore disposed in mounting means attached to the vehicle and a bolt means extending through the first and second bores along the first axis, the method comprising:
   disconnecting the arm member from the mounting means by removing the bolt means;
   positioning a device having a plurality of prongs extending outwardly therefrom for engaging the mounting means such that the device is retained in position, the device having a member with an engaging portion extending outwardly from the device having an outer arcuate surface wherein the outer arcuate surface of the engaging portion secures against the inner curvature of the first bore the member having a third bore that lies along a second axis; and
   reconnecting the arm member by inserting the bolt means through the first, second and third bores to reconnect the arm member to the mounting means such that the second axis is disposed from the first axis.

3. The method of claim 2 and further including drilling out the first bore to a larger diameter and wherein the engaging portion is a disk of approximately the same diameter as the drilled out first bore and whose center is offset from the center of the third bore.

* * * * *